(12) United States Patent
Moyle et al.

(10) Patent No.: US 8,666,731 B2
(45) Date of Patent: Mar. 4, 2014

(54) METHOD, A COMPUTER PROGRAM AND APPARATUS FOR PROCESSING A COMPUTER MESSAGE

(75) Inventors: Stephen Anthony Moyle, Oxford (GB); Graham Kenneth Thwaites, Swindon (GB)

(73) Assignee: Oracle International Corporation, Redwood Shores, CA (US)

( * ) Notice: Subject to any disclaimer, the term of this patent is extended or adjusted under 35 U.S.C. 154(b) by 142 days.

(21) Appl. No.: 12/887,725

(22) Filed: Sep. 22, 2010

(65) Prior Publication Data
US 2011/0131034 A1 Jun. 2, 2011

Related U.S. Application Data

(60) Provisional application No. 61/244,675, filed on Sep. 22, 2009.

(51) Int. Cl.
*G06F 17/27* (2006.01)

(52) U.S. Cl.
USPC ............. 704/9; 370/256; 704/243; 704/3; 705/7.26; 706/13; 706/47; 709/206; 709/207; 709/227; 715/234; 726/26

(58) Field of Classification Search
USPC ............. 709/206, 207, 227; 370/256; 726/26; 704/3, 243, 9; 705/7.26; 706/13, 47; 715/234
See application file for complete search history.

(56) References Cited

U.S. PATENT DOCUMENTS

| 6,199,034 B1 * | 3/2001 | Wical ............................... 704/9 |
| 6,311,278 B1 | 10/2001 | Raanan et al. |
| 6,327,561 B1 * | 12/2001 | Smith et al. ........................ 704/9 |
| 6,470,306 B1 * | 10/2002 | Pringle et al. ..................... 704/3 |
| 7,089,592 B2 | 8/2006 | Adjaoute |
| 7,228,561 B2 | 6/2007 | Sameshima et al. |
| 7,243,086 B2 * | 7/2007 | Polak ............................... 706/13 |
| 7,343,624 B1 | 3/2008 | Rihn et al. |
| 7,415,719 B2 | 8/2008 | Moghe et al. |
| 7,454,779 B2 | 11/2008 | Hughes et al. |

(Continued)

FOREIGN PATENT DOCUMENTS

| EP | 1 830 253 A2 | 9/2007 |
| EP | 1830253 | 3/2009 |

(Continued)

OTHER PUBLICATIONS

Nevill-Manning, C. G. et al., "Compression and explanation using hierarchical grammars", Computer Science Department, University of Waikato, New Zealand, 1997, 22 pages. Retrieved from the Internet: <<http://citeseerx.ist.psu.edu/viewdoc/summary?doi=10.1.1.57.1150>>.

(Continued)

*Primary Examiner* — Michael Colucci

(74) *Attorney, Agent, or Firm* — Kilpatrick Townsend & Stockton LLP

(57) ABSTRACT

Embodiments of the invention provide a method, computer program and apparatus for processing a computer message, the method comprising: upon receipt of a computer message at a computer, classifying the computer message and assigning it a message cluster identification in dependence thereon; and, utilizing a message template to trans-denotate the message, wherein the message template is selected in dependence on the message cluster identification.

15 Claims, 5 Drawing Sheets

(56) References Cited

U.S. PATENT DOCUMENTS

| | | | |
|---|---|---|---|
| 7,458,094 | B2 | 11/2008 | Jackson |
| 7,487,149 | B2 | 2/2009 | Wong |
| 7,549,162 | B2 | 6/2009 | Aaron |
| 7,657,927 | B2 | 2/2010 | Tajalli et al. |
| 7,712,133 | B2 | 5/2010 | Raikar et al. |
| 7,912,701 | B1* | 3/2011 | Gray et al. ............... 704/9 |
| 7,983,900 | B2 | 7/2011 | Moyle |
| 8,028,160 | B1 | 9/2011 | Orr |
| 8,122,508 | B2 | 2/2012 | Rihn et al. |
| 8,132,250 | B2 | 3/2012 | Judge et al. |
| 8,145,474 | B1* | 3/2012 | Daily et al. ............... 704/9 |
| 8,265,925 | B2* | 9/2012 | Aarskog ............... 704/9 |
| 8,311,806 | B2* | 11/2012 | Bonnet et al. ............... 704/9 |
| 8,468,244 | B2* | 6/2013 | Redlich et al. ............... 709/225 |
| 2003/0149562 | A1* | 8/2003 | Walther ............... 704/243 |
| 2003/0195785 | A1* | 10/2003 | Thalangara et al. ............... 705/8 |
| 2004/0015719 | A1 | 1/2004 | Lee et al. |
| 2004/0143791 | A1* | 7/2004 | Ito et al. ............... 715/513 |
| 2004/0153512 | A1* | 8/2004 | Friend ............... 709/206 |
| 2004/0236839 | A1* | 11/2004 | Wilson et al. ............... 709/207 |
| 2005/0132060 | A1* | 6/2005 | Mo et al. ............... 709/227 |
| 2005/0283519 | A1* | 12/2005 | Turgeman et al. ............... 709/206 |
| 2006/0092861 | A1* | 5/2006 | Corday et al. ............... 370/256 |
| 2006/0150238 | A1 | 7/2006 | D'Agostino |
| 2006/0265745 | A1 | 11/2006 | Shackleton et al. |
| 2007/0185703 | A1 | 8/2007 | Moyle |
| 2007/0214504 | A1 | 9/2007 | Milani Comparetti et al. |
| 2007/0256139 | A1 | 11/2007 | Gaos et al. |
| 2008/0120720 | A1 | 5/2008 | Guo et al. |
| 2008/0134336 | A1 | 6/2008 | Rihn et al. |
| 2008/0141332 | A1 | 6/2008 | Treinen |
| 2008/0222734 | A1* | 9/2008 | Redlich et al. ............... 726/26 |
| 2009/0044256 | A1 | 2/2009 | Moyle |
| 2009/0055166 | A1 | 2/2009 | Moyle |
| 2009/0063869 | A1 | 3/2009 | Kohavi et al. |
| 2009/0192968 | A1* | 7/2009 | Tunstall-Pedoe ............... 706/47 |
| 2010/0071061 | A1 | 3/2010 | Crovella et al. |
| 2012/0109639 | A1 | 5/2012 | Moyle |
| 2012/0151590 | A1 | 6/2012 | Rihn et al. |

FOREIGN PATENT DOCUMENTS

| | | |
|---|---|---|
| WO | WO 02/09339 A2 | 1/2002 |
| WO | WO 03/090046 A2 | 10/2003 |
| WO | WO 2010/084344 A1 | 7/2010 |

OTHER PUBLICATIONS

Notification of Transmittal of the International Search Report and Written Opinion of the International Searching Authority, or the Declaration; International Search Report and Written Opinion of the International Searching Authority for corresponding International Application No. PCT/GB2010/050074 mailed on May 18, 2010, 17 pages.
Final Office Action for U.S. Appl. No. 12/187,113 mailed Nov. 9, 2011, 12 pages.
Advisory Action for U.S. Appl. No. 12/187,113 mailed Jan. 12, 2012, 3 pages.
U.S. Appl. No. 13/160,365, filed Jun. 14, 2011, Moyle.
U.S. Appl. No. 13/145,292, filed Dec. 13, 2011, Moyle.
Non-Final Office Action for U.S. Appl. No. 12/187,113 mailed Apr. 5, 2012, 14 pages.
Aho, et al., "Compilers Principles, Techniques, and Tools," Addison-Wesley Publishing Company, Sep. 15, 1985, XP002940830, BNS pp. 1-8 and 149-161.
European Patent Application No. 07250432.7, European Extended Search Report mailed Feb. 18, 2009, 9 pages.
Moyle, S., et al. "Machine Learning to Detect Intrusion Strategies," published in V. Palade, 7th International Knowledge-Based intelligent Information and Engineering Systems (KES 2003), LNAI 2663, 2003, pp. 371-378, Oxford, Springer-Verlag Heidelberg.
Muggleton, S.H., "Learning from positive data", Proceedings of the Sixth International Workshop on Inductive Logic Programming (ILP-96), Lecture Notes in Artificial Intelliegence 1314, pp. 358-376, Berlin, 1996. Springer-Verlag.
U.S. Appl. No. 11/672,253, filed Feb. 2, 2007, Non-Final Office Action mailed Aug. 5, 2010, 17 pages.
U.S. Appl. No. 12/187,104, filed Aug. 6, 2010, Non-Final Office Action mailed Aug. 6, 2010, 10 pages.
U.S. Appl. No. 12/187,104, filed Aug. 6, 2010, Final Office Action mailed Jan. 4, 2011, 10 pages.
U.S. Appl. No. 12/187,104, filed Aug. 6, 2010, Notice of Allowance mailed Mar. 14, 2011, 7 pages.
U.S. Appl. No. 12/187,113, filed Jun. 6, 2008, Non-Final Office Action mailed Apr. 28, 2011, 22 pages.
Non-Final Office Action for U.S. Appl. No. 12/187,113 mailed Oct. 22, 2012, 6 pages.
Notice of Allowance for U.S. Appl. No. 12/187,113 mailed May 9, 2013, 17 pages.

* cited by examiner

METHOD, A COMPUTER PROGRAM AND APPARATUS FOR PROCESSING A COMPUTER MESSAGE

This application claims the benefit of priority to U.S. application Ser. No. 61/244,675, filed Sep. 22, 2009, the content of which is hereby incorporated by reference in its entirety for all purposes.

STATEMENT REGARDING FEDERALLY SPONSORED RESEARCH OR DEVELOPMENT

Not applicable.

BACKGROUND OF THE INVENTION

The invention relates to a method, a computer program and apparatus for processing a message with a computer There are many examples of computer systems in which it is useful to be able to analyse symbols passing through or stored in the computer system. As will be appreciated from the following, the term "symbols" in this context is to be construed broadly. In general, the term "symbols" is used herein in the broad sense, for example, including computer messages, which term is also to be construed broadly and includes for example computer messages in a computer language (including computer instructions, such as executable programs), natural languages in computer-readable form (such as in documents, emails, etc.). "Symbols" also includes computer data in the conventional sense, i.e., typically, abstractions of real world artefacts, etc.

In one example of computer systems in which it is useful to be able to analyse symbols passing through or stored in the computer system, third parties can attempt to take control of a computer by "attacking" the computer system. One class of attack, carried out by third parties involves them tampering with messages in a computer system. Such "attacks" can be carried out by exploiting the well-known buffer overflow vulnerabilities of some computer systems. In another example, hacking can take place by the third party sending commands to the computer system in which the commands are correctly structured in the context of the language of the computer system, but which are intended to cause the computer system to perform undesirable actions including to return an error message that can be used by the third party for reconnaissance or to return inappropriate information to a third party or to gain illegal access to the computer system. Attacks of this type on relational databases are well known and yet are difficult to defend against. Relational databases are widely used, and are used for example by e-commerce and many other websites to hold user data (such as login name and password, address and credit card details, etc.).

In another example, it may be desirable to monitor computer symbols or messages to ensure that the computer system is being used properly and that for example it is not being used inappropriately. For example, in an organisation, a user may be using a computer system inappropriately, for example by using the system for purposes for which the user is not authorised, and yet which is not intended by the user to be an "attack" on the computer system as such.

In our co-pending US and European patent applications entitled "A method, A Computer Program and Apparatus for Analysing Symbols in a Computer" having application numbers U.S. Ser. No. 11/672,253 and EP-A-1,830,253, respectively, there is described and disclosed a method for analysing symbols in a computer system. The method and apparatus, referred to herein as "Efficient Grammatical Clustering" ("EGC"), described in the aforementioned patent applications, provides a means to understand usage patterns based on messages entering (or leaving) computer systems. For example, EGC provides a means of being able to recognise messages that are the different database commands entering a relational database system. This enables a baseline of normal behaviour to be determined. EGC enables all new messages, i.e. messages that have not been seen by the system previously, to be recognised so that a proactive device can determine whether a new message (command) should be allowed to pass to the database or not.

The EGC patent applications, the entire contents of which are hereby incorporated by reference, relate to a method by which a unique execution path of any instrumented computer program can be determined. Such an execution path provides the basis for generalisation of execution paths into semantically similar clusters. Each execution path can be assigned a unique cluster identifier.

In one embodiment of the EGC patent applications, grammatical clustering of messages which are sentences within a computer language is performed. In this case, the computer program is a parser and the execution path is generated by the operation of the parser on some input sentence messages (in the appropriate computer language). In the EGC method, parsing of the incoming messages is thus extremely important as it is the parsing of the messages that enables the respective execution paths to be determined from which the unique cluster identifier can be assigned to the message.

Referring to FIG. 1, the EGC method is briefly described. There is shown in FIG. 1 an example of a computer system 106 connected to a network 105. The computer system 106 has a computer resource 103 which might be, for example, a relational database. The computer system 106 makes its computer resource 103 available to applications 102 interacting directly or across the computer network 105 to support one or more users 101. The interaction with the computer resource 103 is mediated through a computer language via the transmission of messages MSG 104 within the message language. Such messages are an example of "symbols", as mentioned above, within the computer system. A process 202 is provided operating within or on the computer system 106 to observe messages. The message and the intent of the message can be determined via another process 201 explained below.

Typically, the messages MSG 104 might be used to specify the desired operational behaviour of components in the computer system 106. Thus, messages are used between components within the computer system, and messages are used by users to gain access to the computer system 106. Computer languages are used to facilitate the use of messages in the computer system. Each computer language is defined by a grammar so that messages conform to a known syntax. The grammar of such languages is published so that software developers can ensure that the messages of the software conform to the correct syntax.

The grammar of the computer language of the messages that are to be analysed is defined, e.g. using first order logic. This may be carried out in a manner that is known per se. For example, the programming language Prolog can be used to describe the grammar of the language as a set of first order logic. This logic is then applied initially to a set of training examples of messages. Such messages are defined so as to be correct syntactically in the context of the language and appropriate in the sense that they are messages that are deemed to be acceptable in the context of usage of the system around which the messages pass. The logic contains clauses. When the logic is applied to the messages, the identity of the clauses along a successful path through the logic is noted. In this way, paths of acceptable messages being parsed via the logic are obtained. These paths can then be grouped according to similarity. In turn, the messages that follow the respective paths can be grouped according to similarity in this sense, so that patterns of similar messages can be discerned. This means that new messages, which are different from messages used in the training, can then be allocated to patterns of messages that are known to be acceptable, or rejected.

The EGC method works by analysing symbols into patterns, so that new symbols can be analysed more efficiently than in other known techniques. This enables the EGC methodology to be implemented in real-time with relatively little computational overhead. In one example, the method is carried out on new symbols to determine whether the new symbols fit a pattern of data that is known or constitute a new pattern. Patterns may also be referred to as "clusters" as they represent a cluster of similar paths through the computer logic. In practice, if the new symbols fit a pattern that is known, then a decision will already have been made as to whether symbols fitting that known pattern are to be deemed acceptable or not. If the symbols constitute a new pattern, in practice a decision will have been made what to do with symbols that constitute a new pattern, such as "always deem not acceptable" or "send error report", etc.

The EGC system and method is not concerned with generating new rules for new messages. Instead, it is concerned with determining patterns for computer messages. In one embodiment, the patterns that are obtained can then be considered, for example "manually" by a human user, to determine whether a computer system has been compromised.

BRIEF SUMMARY OF THE DISCLOSURE

According to a first aspect of embodiments of the invention, there is provided a method of processing a computer message, the method comprising: upon receipt of a computer message at a computer, classifying the computer message and assigning it a message cluster identification in dependence thereon; and, utilising a message template to trans-denote the message, wherein the message template is selected in dependence on the message cluster identification.

In embodiments, the method is particularly useful for any or all of preventing the original message from arriving at the destination so that its effect is to block the meaning from arriving whilst keeping the both the transmitting device and the receiving device in an operating state; changing the message to ensure that any response does not contain sensitive information; changing the destination of the message so that the requester receives an expected reply. The message can be changed so as to improve some property of the message (e.g. security, performance, correctness, efficiency of processing, change of data, change of representation). For example a template can be structured so that the message as transmitted to the resource only requests information that is needed.

Thus, a technical solution is provided to improve message denotation efficiency. The use of message templates and classification ensures a quick, robust reliable means for denotating computer symbols or messages.

In an embodiment, the received message can be changed so as to ensure that elements of the message are transmitted to a resource or user securely. For example, where a message contains a request for some confidential information such as a credit card number, which is no longer appropriate for the requestor's processing, but it is difficult for the requester to change the originating message. The transmitted message can be replaced with a received message with all aspects being the same as the transmitted message, except that the component relating to the credit card number is removed. In one example, the message can be translated from one language to a message in another language (or dialect of the same language) for transmission. This can be useful where, for example, the requestor may be sending messages for a relational database in the SQL message format. However, the database has been upgraded to receive messages in the XML format. The transmitted SQL message can be replaced with a received XML format message that will return the same results to the requester.

In a preferred embodiment, classification of the message is performed using efficient grammatical clustering.

Thus, an embodiment of the method builds on the invention described in the patent applications referred to above that relate to "Efficient Grammatical Clustering" (EGC). The invention provides a method relating to changing the denotation of a message that is classified into a Grammatical Cluster to effect the meaning of the message and retransmitting the message (or messages) that matches the Grammatical Cluster with the new denoted meaning. The message can be retransmitted either to its original intended destination or an alternative destination, or both.

Embodiments of this invention provides a method by which a received message in a given language is assigned a semantic cluster ID or message classification and can thus easily be reformed and/or replaced so that the receiver gets a different message or that a different message is sent to an alternative receiver, or both. The original message may be transcribed into an alternative message with an alternative denotation.

This method operates with the use of a "message template" which specifies the trans-denotation to be performed on a message. This message template may preferably contain a message template "Head" and a message template "body".

A particular advantage of linking transcription to grammatical clustering, e.g. such as described in our co-pending U.S. patent application Ser. No. 11/672,253 and EP-A-1,830, 253, is that the incoming message is guaranteed to contain the appropriate grammatical structure or "shape" (within the confines of the message grammar and its instrumentation) before the matching process of the incoming message against the message template head begins. For instance the significant language keywords and other language identifiers etc will occur with the same relative positions and frequencies in both the input message and the message template head. Moreover, successful grammatical clustering also guarantees that the message is already syntactically valid so there is no need to cope with incomplete or invalid messages. Thus, these two aspects—prior correct structure and prior syntactic validity—together provide a context which limits the complexity of the problem of transcription using pattern matching against a template.

Conventionally, techniques like regular expression processing of messages have detailed problems with whitespace, comments (particularly those including valid message fragments) and upper/lower case resolution aggravated by coarse message classification and poor identification of grammatical subcomponents. These problems are avoided by the method of trans-denotation described herein. Trans-denotation relates to the changing of the denotational semantics of a message. The detonational semantics of a language (typically a computer programming language) is the construction of objects known as "denotations" to describe the meaning of the expressions in the language.

In an embodiment, the method comprises, upon receipt of the message, tokenizing the message to produce a sequence of message tokens corresponding to the message.

Preferably, the message template includes a template head which corresponds to the format of the received message and a template body which corresponds to the format of the output message. The templates may preferably be specified using a BNF (Backus-Naur Form) grammar as shown below (Table 2). This is merely one possible grammar that may be used to specify the templates and it will be appreciated that any suitable grammar could be used.

Preferably, the method comprises tokenizing the template to produce a sequence of head template tokens and a sequence of body template tokens.

In one embodiment, a series of output tokens are generated corresponding to the output message. The output tokens may then be processed by a language aware de-tokenizer to generate the output message.

Preferably, the message template includes parameterization to enable operations to be performed on parameters within a received message.

Preferably, the message template includes one or more guard functions to perform a test on an input message parameter or a set of input message parameters.

Preferably, the message is a query to a relational database, e.g. in Structured Query Language (SQL).

Preferably, the method comprises generating at least one alternative message based on the received input message.

In an embodiment, the template is arranged such that the received message is translated from one language to another.

Preferably, the trans-denotation serves to change a received message to one that has improved properties (for example security, performance, correctness, efficiency of processing, change of data, change of representation) and/or to change the message so that elements of the message are no longer publicly readable.

In one embodiment, the input message is changed prior to forwarding to a resource such that the resource is prevented from answering the message in a defined manner.

In one embodiment, the input message is changed prior to forwarding to a resource such that the resource responds with a reply that no longer contains sensitive information.

Thus, in embodiments, a method is provided for translating an input message to zero or more alternative messages. The method may be used to translate a message from one language to another. In another embodiment, the method may be used to translate a message where the message has been classified by efficient grammatical clustering (EGC). The method is arranged to translate a message utilising a trans-denotation template. In another embodiment, the method may be used to translate a message utilising a trans-denotation template where both the message and the trans-denotation template have been classified by EGC. In an embodiment, the method is used to translate a message utilising a trans-denotation template containing parameterisation and/or guards. The method also provides a way of matching sequences of message tokens generated by a language aware tokenizer utilising a trans-denotation template whose head has been tokenized by another (possibly different) language aware tokenizer to produce a sequence of output tokens. In another embodiment, the method is for producing a message text from a sequence of tokens utilizing a language aware de-tokenization process.

In one embodiment, there is provided a method for changing the message received by a resource so that the resource is prevented from answering the message in a dangerous manner. The method may also or alternatively, be for changing the message received by a resource so that the resource responds with a reply that no longer contains sensitive information. In an embodiment, the method is for changing a message to one that has improved properties (for example security, performance, correctness, efficiency of processing, change of data, change of representation). In one example, the method changes a message so that elements of the message are no longer publicly readable.

According to a second aspect of embodiments of the invention, there is provided a computer program, optionally stored on a computer readable medium, which when run on a computer causes the computer to execute the method of the first aspect of the invention.

According to a third aspect of embodiments of the invention, there is provided a computer or computer system arranged to perform the method of the first aspect of the invention.

BRIEF DESCRIPTION OF THE DRAWINGS

Embodiments of the invention will now be described by way of example with reference to the accompanying drawings, in which.

DETAILED DESCRIPTION

Figure 1:
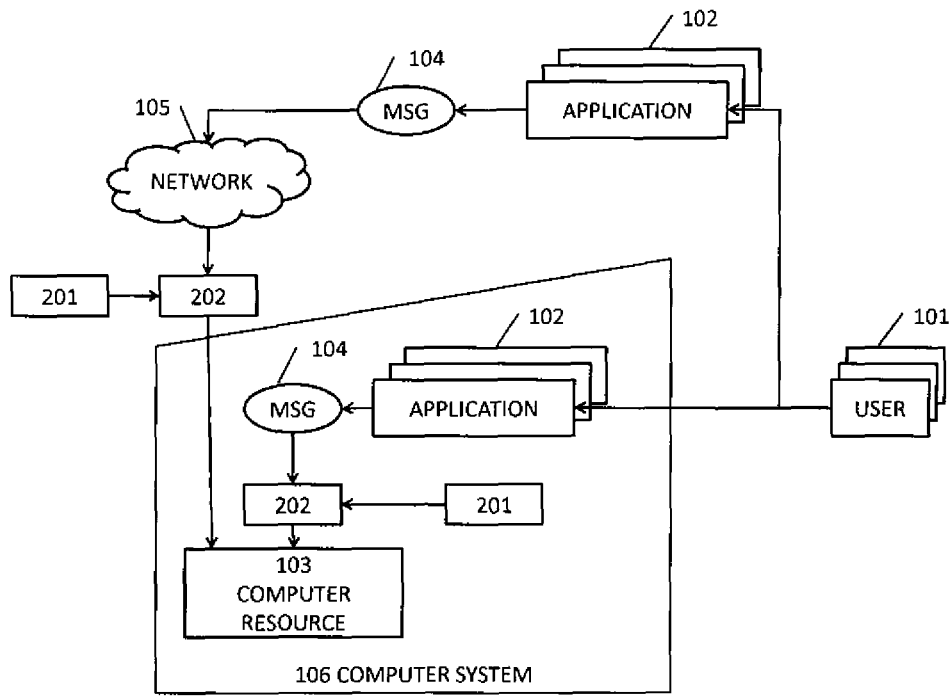
FIG. 1 shows a schematic representation of a computer system.

FIG. 1 shows a schematic representation of a computer system 106. The system 106 makes its computer resource 103 available to applications 102 interacting directly or across a computer network 105 to support one or more users 101. The interaction with the computer resource 103 is mediated through some computer language via the transmission of Messages MSG 104 within the message language. The message can be observed by a process 202 and the intent of the message can be determined via a process 201 as will be explained below.

Figure 2:
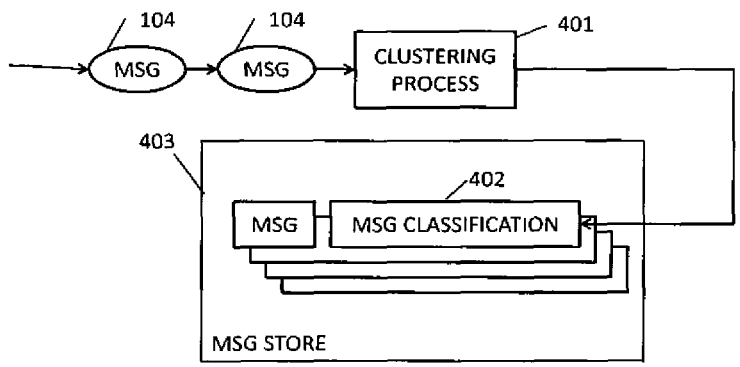
FIG. 2 shows a simplified schematic flow chart for a process by which messages are classified or clustered.

Referring to FIG. 2, there is shown a simplified schematic flow chart for the process 201 by which messages are classified or clustered, using the EGC method. Messages MSG 104 received by a computer are clustered using the EGC process 401 which produces a classification MSG CLASSIFICATION 402 of the message. The message classifications are stored, along with a copy of the respective messages, in a message store MSG STORE 403. As well as the message, other attributes about the message can be included in the message store. For example, these attributes could include, amongst others; the date & time the message was received; the username or application name that sent the message; network addressing information about the source and destination of the message; etc.

The EGC system works well. In particular, by analysing the symbols into patterns, new symbols can be analysed more efficiently than in previous known techniques, which makes it possible to implement the method in real-time with relatively little computational overhead.

For each message the Clustering Process 401 provides a unique classification MSG CLASSIFICATION 402 of the semantic intent of the message. This uniqueness allows syntactically different messages to be classified in the same way because their class of semantic intent has been denoted to be identical. In the context of a computer resource that is a relational database the messages are received at the computer resource in the language of SQL. The unique message classification 402 for seven specific messages is shown below in Table 1 which also includes the message tokens for the messages as determined by a language aware tokenizer.

Figure 3:
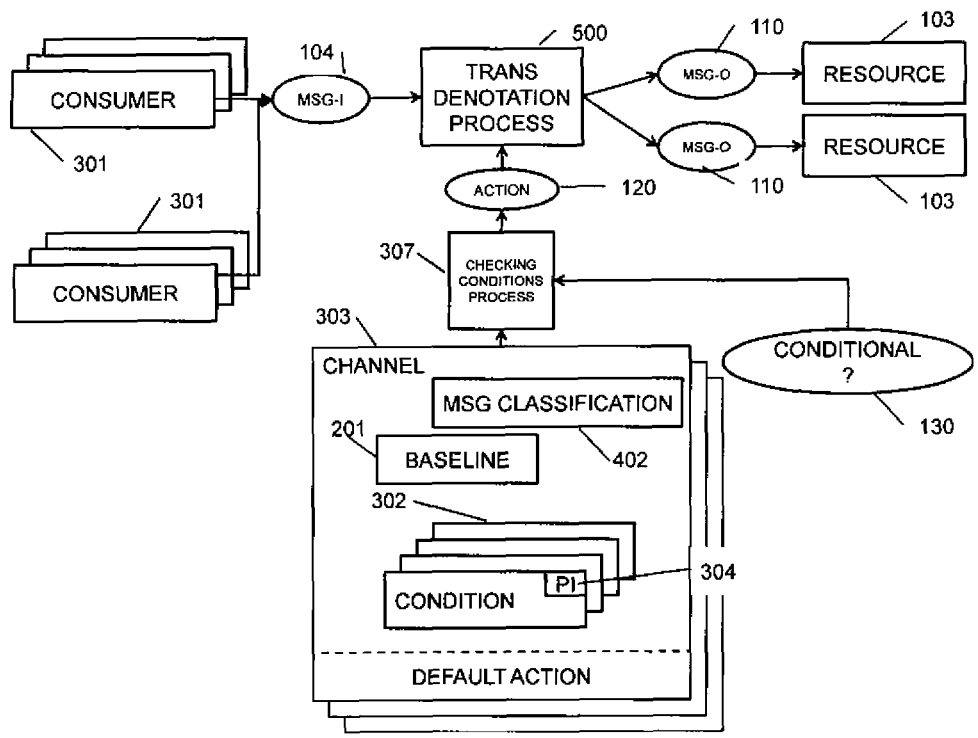
FIG. 3 shows schematically a system for message transdenotation.

FIG. 3 shows schematically the general setting for the present method. Reference is also made to our co-pending U.S. patent application Ser. No. 12/185,120 "Enforcing Multiple Behaviour Sets When Accessing Shared Resources" the entire contents of which are hereby incorporated by reference. A number of consumers 301 of services from a resource 103 are shown. The consumers 301 are transmitters of input messages MSG-I 104. A Checking Conditions Process 307 is provided to which each input message MSG-I 104 is subjected. The Checking Conditions Process 307 will be described in detail below. It utilises information held in a Channel Policy 303 to determine what Conditional 130 or Action 120 to take on the input message MSG-I 104 before passing it to a TRANS DENOTATIONAL PROCESS 500 described in detail below.

TABLE 1

| Message Classification | Message | Message Tokens |
|---|---|---|
| 13428614 | select max(Sno), min(Sno) from tbl_Syslog | [keyword(select, 1), identifier(max, 8), left_paren(11), identifier(sno, 12), right_paren, comma, identifier(min, 18), left_paren(21), identifier(sno, 22), right_paren, keyword(from, 27), identifier(tbl syslog, 32), endoftext(41)] |
| 440536710 | select 100 | [keyword(select, 1), decimal([49, 48, 48]), endoftext(10)] |
| 376125926 | SELECT t3.Sno, t3.MasterIP, t3.MasterPort, t3.SlaveIP, t3.SlavePort, t3.Mode, t3.Enable, t3.Status, t3.Remark, t3.FilterSeverity, t3.FilterString, t3.ForwardNoForNMS, t3.DeleteNoForNMS, t3.ForwardNoForNE, t3.DeleteNoForNE, t3.AlarmStateFROM tbl_SyslogServer t3 | [keyword(select, 1), identifier(t3, 8), period(10), identifier(sno, 11), comma, identifier(t3, 16), period(18), identifier(masterip, 19), comma, identifier(t3, 29), period(31), identifier(masterport, 32), comma, identifier(t3, 44), period(46), identifier(slaveip, 47), comma, identifier(t3, 56), period(58), identifier(slaveport, 59), comma, identifier(t3, 70), period(72), identifier(mode, 73), comma, identifier(t3, 79), period(81), identifier(enable, 82), comma, identifier(t3, 90), period(92), identifier(status, 93), comma, identifier(t3, 101), period(103), identifier(remark, 104), comma, identifier(t3, 112), period(114), identifier(filterse verity, 115), comma, identifier(t3, 131), period(133), identifier(filterstring, 134), comma, identifier(t3, 148), period(150), identifier(forwardnofornms, 151), comma, identifier(t3, 168), period(170), identifier(deletenofornms, 171), comma, identifier(t3, 187), period(189), identifier(forwardnoforne, 190), comma, identifier(t3, 206), period(208), identifier(deletenoforne, 209), comma, identifier(t3, 224), period(226), identifier(alarmstate, 227), keyword(from, 238), identifier(tbl_syslogserver, 243), identifier(t3, 260), endoftext(261)] |
| 341757382 | update TELog set FirstRecordID=15310000, LastRecordID=15402099, CurrentLogSize=92000 where LogD= 4 | [keyword(update, 1), identifier(telog, 8), keyword(set, 14), identifier(firstrecordid, 18), equals_operator, decimal([49, 53, 51, 49, 48, 48, 48, 48]), comma, identifier(lastrecordid, 43), equals_operator, decimal([49, 53, 52, 48, 50, 48, 57, 57]), comma, identifier(currentlogsize, 67), equals_operator, decimal([57, 50, 48, 48, 48]), keyword(where, 88), identifier(logd, 94), equals_operator, decimal([52]), endoftext(100)] |
| 286739302 | SELECT COUNT (*) FROM tbl_Log t29 | [keyword(select, 1), identifier(count, 8), left_paren(14), asterisk, right_paren, keyword(from, 18), identifier(tbl_log, 23), identifier(t29, 31), endoftext(33)] |
| 123594774 | SELECT * FROM foo | [keyword(select, 1), asterisk, keyword(from, 10), identifier(foo, 15), endoftext(17)] |
| 190567446 | SELECT * FROM bar | [keyword(select, 1), asterisk, keyword(from, 10), identifier(bar, 15), endoftext(17)] |

The channel or channel policy basically defines the type or context of a user. This can include various factors as appropriate. For example it could include factors such as Internet Protocol (IP) addresses of users, time of message transmission or other factors that serve to define a type or context of a user. Once the message has been trans-denoted, the generated output message(s) MSG-O 110 is (or are) transmitted to the resource 103.

As will be explained below, the Information held in a Channel Policy 303 can consist of (but not be limited to) the following:

The classification of the message MSG CLASSIFICATION 402 which has been described above;

A BASELINE 201 of previously observed messages and other parameters;

A set of Policy CONDITIONS 302 of which particular conditions of Policy Information (PI) 304 may match; and A DEFAULT ACTION to be taken if no other CONDITIONs 304 match.

Embodiments of the invention provides a way of changing the denotation of the input message to the denotation of an alternative output message and preferably then generating the output message itself. Furthermore, the transmission of the output message may be sent to multiple alternative resources other than the one originally intended to receive the message.

Figure 4:
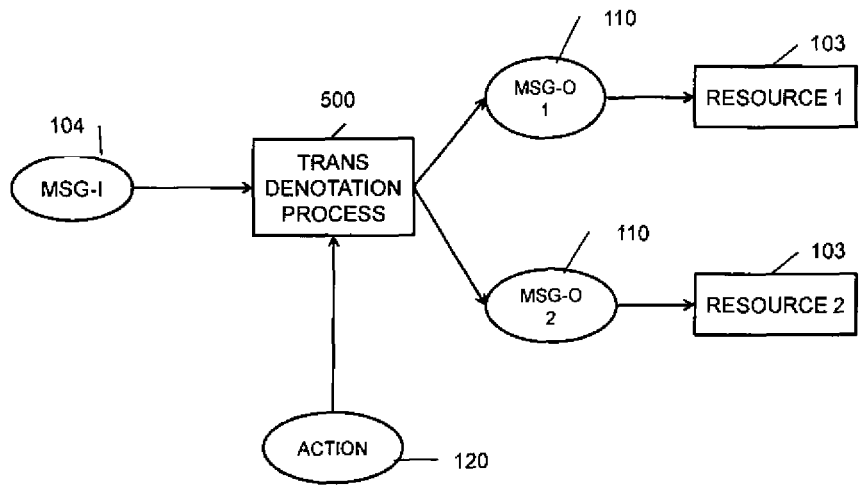
FIG. 4 shows a simplified view of the steps in message transdenotation.

As shown schematically in FIG. 4 above, the TRANS DENOTATION PROCESS 500 receives as an input a message MSG-I 104, and an ACTION 120. The process 500 produces zero or more output messages 110 MSG-O[1, 2, . . . ] and transmits the output messages to the appropriate RESOURCEs 103. The ACTION 120 determines whether the TRANS DENOTATION PROCESS 500 will be enacted or not. For example an action may be to substitute the input message MSG-I 104 with an appropriate output message MSG-O 110.

One of the factors that the CHECKING CONDITIONS PROCESS 307 referred to above with reference to FIG. 3, utilizes is the MESSAGE CLASSIFICATION 402. This is preferably determined by Efficient Grammatical Clustering described above and also in detail in our co-pending U.S. and European patent applications U.S. Ser. No. 11/672,253 and EP-A-1,830,253. The MESSAGE CLASSIFICATION 402 for a message may also be termed the cluster identifier or simply "cluster ID". It is significant that the processing of one input message may generate zero or more output messages.

Figure 5:
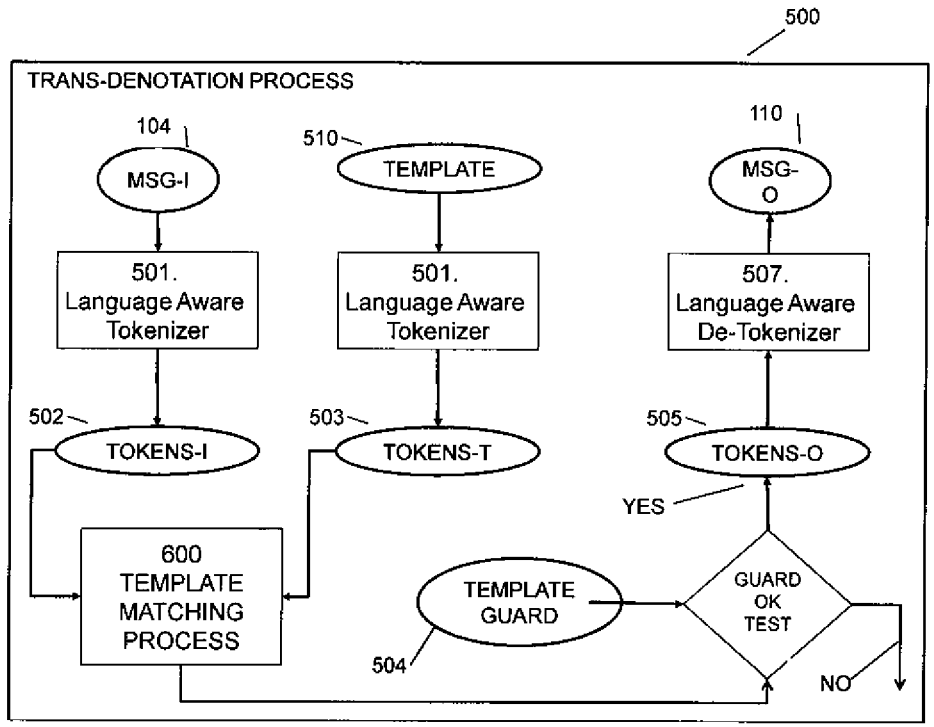
FIG. 5 shows in greater detail the steps in message transdenotation.

FIG. 5 shows a schematic representation of a message Trans-Denotation process. As shown, the inputs to the process are the input message MSG-I 104 and the TEMPLATE 510. The TEMPLATE 510 is provided during a configuration process and the particular template for use in a trans-denotation process is selected in dependence on the classification of the received input message. Each of the input message MSG-I 104 and the TEMPLATE 510 are individually sent to a language aware tokenizer 501. The language aware tokenizer may be for the same language or a different language or dialect. The language aware tokenizer 501 produces TOKENS-I 502 from the input message MSG-I 104. Examples of tokenized messages are shown above in Table 1. The language aware tokenizer 501 produces TOKENS-T 503 from the TEMPLATE 510. The input message tokens TOKENS-I 502 and the template TOKENS-T 503 are then sent to the TEMPLATE MATCHING PROCESS 600, described below.

The message trans-denotation process includes a GUARD OK TEST which is performed after the matching the input tokens TOKENS-I 502 and the output tokens TOKENS-O 503 using the TEMPLATE MATCHING PROCESS 600. The functions of the TEMPLATE GUARD 504 are applied to the values associated with the parameter tokens. Parameter tokens will be discussed in greater detail below.

If the GUARD TEST OK is successful, i.e. when the outcome is YES, then the TEMPLATE MATCHING PROCESS 600 produces a sequence of output tokens TOKENS-O 505. This may result in other parameter tokens becoming instantiated to a value. Failure of the GUARD TEST OK, i.e. when the outcome is NO, may lead to the trans-denotation process being aborted, in which case the output message MSG-O 104 may be set to be the same as the input message MSG-I 104.

Once the output tokens TOKENS-O 505 have been generated and the GUARD TEST OK has been successful, the output tokens TOKENS-O 505 are passed to a language aware de-tokenizer 507 for processing to generate the corresponding output message MSG-O 110.

Figure 6:
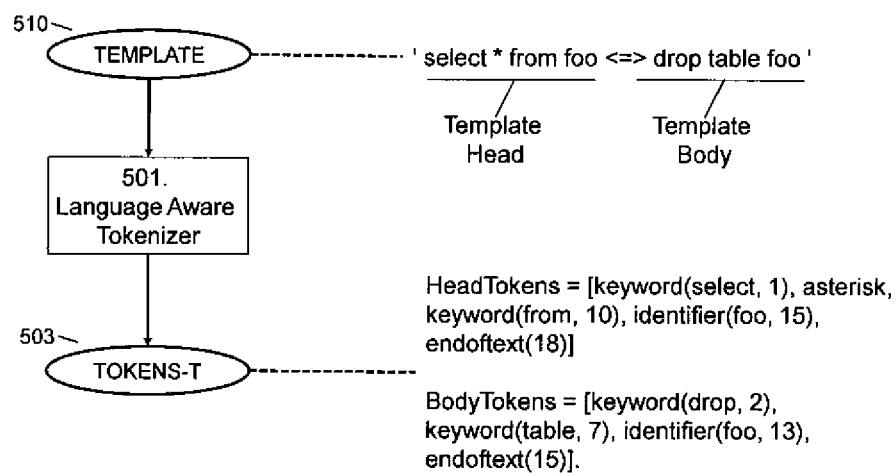
FIG. 6 shows the tokenization of a template without parameterisation.

FIG. 6 shows an example of the tokenization of a template. In this simple example, utilizing the database language SQL, the TEMPLATE 510 is 'select * from foo <=> drop table foo'

The template 510 is expressed as two parts; the template head ('select * from foo') and the template body ('drop table foo'). These are processed by the Language Aware Tokenizer 501 to produce sequences of HeadTokens and BodyTokens. FIG. 6 shows an example of the tokenization of a template. In FIG. 6, the template 510 is expressed as two parts; the template head ('select * from foo') and the template body ('drop table foo'). These are processed by the language aware tokenizer 501 to produce Tokens-T 503 which are the sequences of HeadTokens and BodyTokens shown.

HeadTokens:

[keyword(select, 1), asterisk, keyword(from, 10), identifier(foo, 15), endoftext(17)]

BodyTokens:

[keyword(drop, 2), keyword(table, 7), identifier(foo, 13), endoftext(15)]

Figure 7:
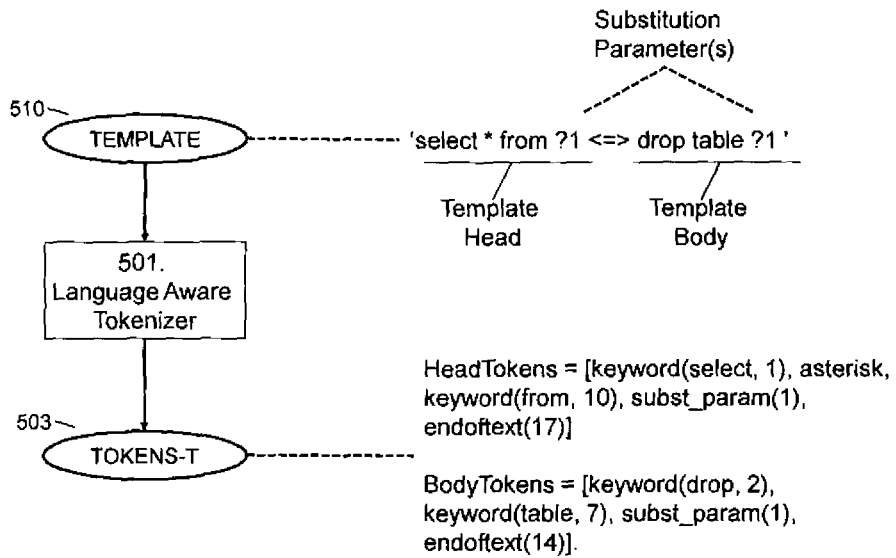
FIG. 7 shows the tokenization of a template with parameterisation.

FIG. 7 shows a second example of the tokenization of a template. In this example the template 510 contains Substitution Parameters denoted by a question mark (?) followed by an integer identifier. The Substitution Parameter is replaced dynamically in the TEMPLATE MATCHING PROCESS 600 described below.

Figure 8:
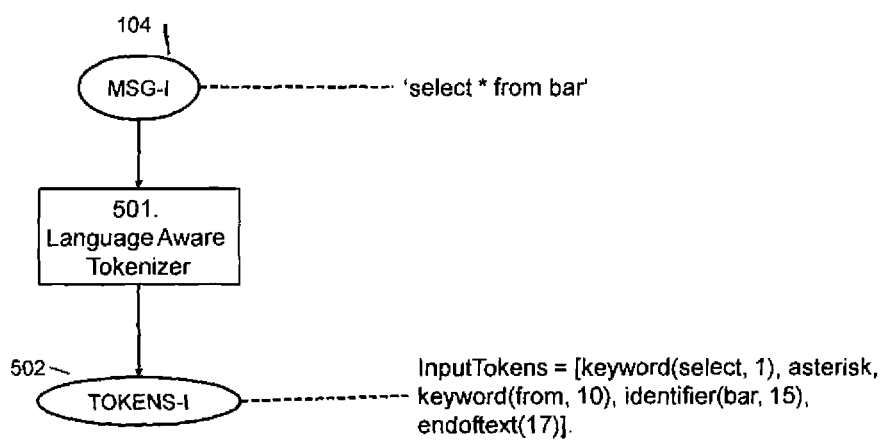
FIG. 8 shows the tokenization of an input message.

Next, the input message MSG-I 104 is tokenized. FIG. 8 shows an example of the tokenization of an input message MSG-I 104 in SQL. In this case, the input message is "select * from bar". In SQL the asterisk "*" is a wild card meaning "all entries" and "bar" is the name of a table. Thus, the message means, "bring back all records from the table called "bar"". The language aware tokenizer produces the following sequence of message tokens for this input message:

[keyword(select, 1), asterisk, keyword(from, 10), identifier(bar, 15), endoftext(17)].

Figure 9:
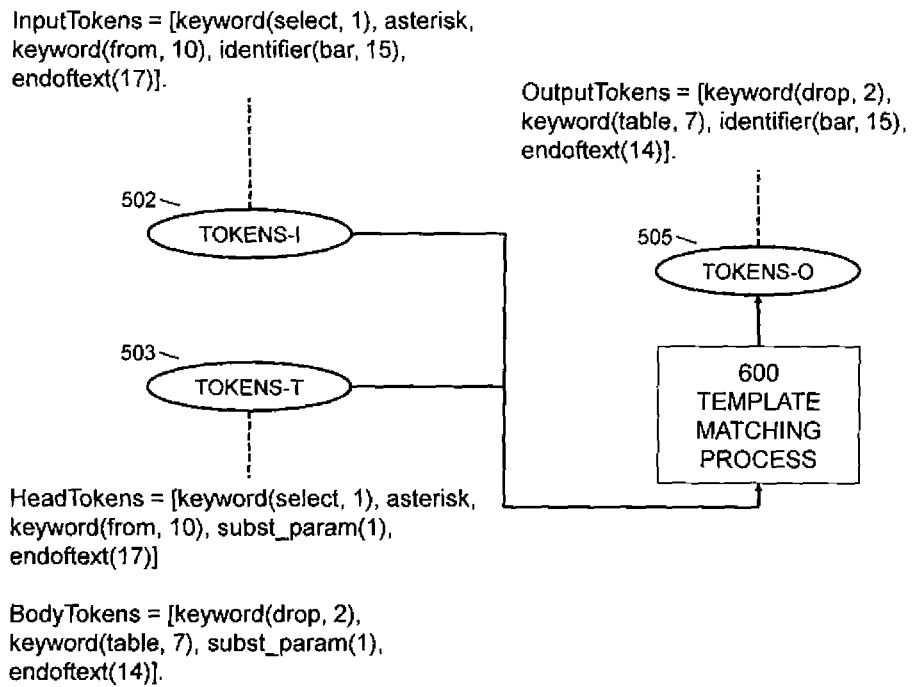
FIG. 9 shows a token matching process by which input message tokens and template tokens are matched; and, FIG. 10 shows the generation of an output message from a sequence of output message tokens.

Next, once an appropriate template and the input message have both been tokenized, matching of the template tokens TOKENS-T 503 and the input message tokens TOKENS-I 502 is performed by the TEMPLATE MATCHING PROCESS 600 referred to above with reference to FIG. 5. FIG. 9 shows an example of how this process is performed. The TEMPLATE MATCHING PROCESS 600 matches tokens from the input message TOKENS-I 502 and the HeadTokens from the template tokens TOKENS-T 503 to determine the parameters to substitute and the values to substitute. The parameters to substitute are then matched with the substitution parameters in the BodyTokens from the template tokens TOKENS-T 503. For every occurrence of a substitution parameter in the template the token is replaced with the value of the parameter from the input message tokens to form a sequence of output tokens TOKENS-O 505. The output tokens are then used by a language aware de-tokenizer to generate the output message, as will be explained in greater detail below.

Figure 10:
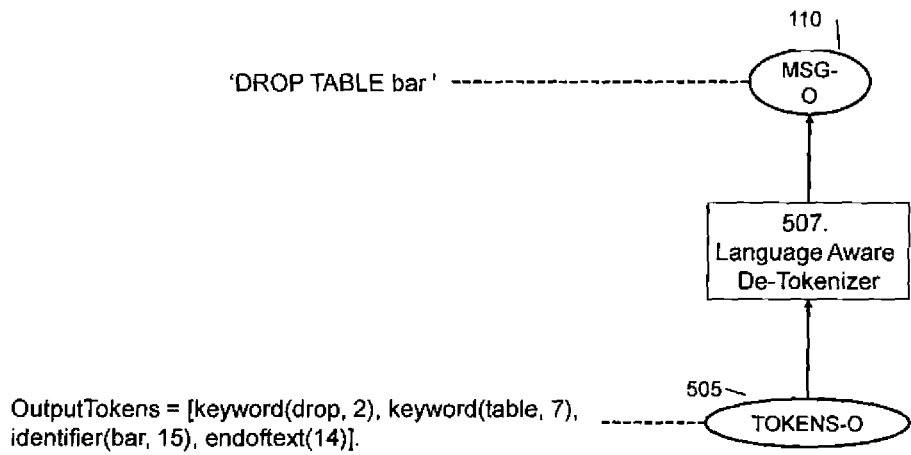

FIG. 10 shows the final stage in generating the output message MSG-O 110. In this case, the sequence of output tokens TOKENS-O 505 is processed by the language aware de-tokenizer 507 to generate the output message MSG-O 110. The output tokens in this simple example are:

[keyword(drop, 2), keyword(table, 7), identifier(bar, 15), endoftext(14)]

The language aware de-tokenizer, from this sequence of output tokens generates the trans-denotated output message "DROP TABLE bar". As can be seen the original input message "select * from bar" has been trans-denotated to the output message "DROP TABLE bar" based on the trans-denotation template 'select * from foo <=> drop table foo'. It is to be noted that the symbol "<=>" is not part of the language SQL and is used to demarcate the template head and body. This symbol has no meaning in SQL and thus will be understood by the tokenizers to be a marker as opposed to being a part of the template itself.

The substitution template can be specified using the BNF grammar shown below in Table 2.

TABLE 2

```
<TEMPLATE> :== <LHS> [ "<|>" <GUARD> ] "<=>" <RHS>
<LHS> :== <ARGUMENT> [ <LHS> ]
<RHS> :== <RHSITEM> [ <RHS> ]
<RHSITEM> :== <ARGUMENT> | <FUNCTION>
<GUARD> :== <FUNCTION> [ "," <GUARD> ]
<FUNCTION> :== "?" <FUNCNAME> "(" <ARGUMENT_LIST> ")"
<ARGUMENT_LIST> :== <ARGUMENT> [ "," <ARGUMENT_LIST> ]
<ARGUMENT> :== <PARAMETER> | <TEXT>
<PARAMETER> :== "?" <PARAMETER NUMBER>
<PARAMETER NUMBER> :== {1, ...}
<FUNCNAME> :== {A..Z, ...}
``` ing process of the incoming message against the message template head begins. Thus, as explained above, the significant language keywords and other language identifiers etc will occur with the same relative positions and frequencies in both the input message and the message template head.

Furthermore, successful grammatical clustering ensures that the input message to be trans-denotated is already syntactically valid so there is no need to cope with incomplete or invalid messages. Where EGC is used, this is because the cluster ID assigned to a message and used to determine the template to use is based on the EGC process which determines the syntactic execution path of a message through a program. Prior correct structure and prior syntactic validity together provide a context which limits the complexity of the problem of transcription using pattern matching against a template. Conventionally, when a process such as regular expression processing of messages, e.g. as described in, Regular Expressions, *The Single UNIX Specification, Version 2*, The Open Group, 1997, is used, there might be problems with whitespace, comments (particularly those including valid message fragments) and upper/lower case resolution aggravated by coarse message classification and poor identification of grammatical subcomponents.

Simple Template Specification

A number of non-limiting examples will now be given of simple template specifications, as might be used with examples of input messages (MSG-I) in the language SQL for interacting with relational databases. Table 3 below shows two examples of messages. Each of the messages MSG 104 (typically input messages) is shown with its message classification 402 as determined by EGC, and the message tokens TOKENS-I 502 generated by the SQL language aware tokenizer 501.

TABLE 3

| Message Classification | Message | Message Tokens |
| --- | --- | --- |
| 90943511 | SELECT * FROM users | [keyword(select, 1), asterisk, keyword(from, 10), identifier(users, 15), endoftext(19)] |
| 716666902 | UPDATE directs SET [direct_timeout] = 2 WHERE [direct_timeout] = 60; | [keyword(update, 1), identifier(directs, 8), keyword(set, 16), identifier(direct_timeout, 20), equals_operator, decimal([50]), keyword(where, 41), identifier(direct_timeout, 47), equals_operator, decimal([54, 48]), semicolon(68), endoftext(68)] |

There will now be described in detail a number of examples to illustrate the templates and the generated output messages based on input messages in SQL. It is of course the case that template processing in SQL is merely one particular example. The same approach can be applied to other languages whereby messages have been classified, e.g. via EGC, and corresponding templates are provided. The message templates specify the trans-denotation to be performed on a message.

A particular advantage of linking trans-denotation to grammatical clustering, i.e. both the messages and the templates are selected in dependence on their cluster ID, is that the incoming message is guaranteed to contain the appropriate grammatical structure or 'shape' (within the confines of the message grammar and its instrumentation) before the matching process of the incoming message against the message template head begins.

The trans-denotation of the examples in Table 3 with respect to templates 510 from input message MSG-I 104 to output message MSG-O 502 is given below in Tables 4A and 4B. There is no resulting parameterisation for these Simple Template Specifications.

TABLE 4B

| Template 1: | SELECT * FROM users <=> SELECT id FROM users |
| --- | --- |
| Input Message: | SELECT * FROM users |
| Parameterisation: | <none> |
| Output Message: | SELECT id FROM users |

In this example, the input message is trans-denotated into an output message in which the request in the original message for all entries (the asterisk) from the table "users" has been narrowed to a request only for the entries for the attribute "id" which is stored in the table "user".

TABLE 4A

| | |
|---|---|
| Template 2: | UPDATE directs SET [direct_timeout] = 2 WHERE [direct_timeout] = 60; <=> UPDATE directs SET [direct_timeout] = 2 WHERE [direct_timeout] = 2; |
| Input Message: | UPDATE directs SET [direct_timeout] = 2 WHERE [direct_timeout] = 60; |
| Parameterisation: | <none> |
| Output Message: | UPDATE directs SET [direct_timeout] = 2 WHERE [direct_timeout] = 2; |

Similarly, in this example, the output message has "2" as the value for the variable "[direct_timeout]" instead of "60". In both of these simple examples there are no "parameters" in the templates, merely fixed and predetermined values, e.g., "2", "60" and "id".

Simple Template Specifications with Parameterisation

A number of examples will now be given for illustrative purposes only of simple template specifications with parameterisation. Examples of input messages MSG-I, again in SQL for interacting with relational databases are shown below in Table 5.

Each of the messages MSG 104 (typically input messages) is shown with its message classification 402 as determined by EGC, and the message tokens TOKENS-I 502 generated by the SQL language aware tokenizer 501.

TABLE 5

| Message Classification | Message | Message Tokens |
|---|---|---|
| 443650071 | SELECT * FROM users where username = 'fred'; | [keyword(select, 1), asterisk, keyword(from, 10), identifier(users, 15), keyword(where, 21), identifier(username, 27), equals_operator, quoted(fred, 38), semicolon(44), endoftext(44)] |
| 1497337878 | SELECT * FROM users WHERE username = 'fred' AND password = 12324; | [keyword(select, 1), asterisk, keyword(from, 10), identifier(users, 15), keyword(where, 21), identifier(username, 27), equals_operator, quoted(fred, 38), keyword(and, 45), identifier(password, 49), equals_operator, decimal([49, 50, 51, 50, 52]), semicolon(65), endoftext(65)] |
| 1578954806 | UPDATE users SET [username] = 'andy', [password] = 'andy', [accountNo] = '10020431' WHERE [id] = '1999'; | [keyword(update, 1), identifier(users, 8), keyword(set, 14), identifier(username, 18), equals_operator, quoted(andy, 31), comma, identifier(password, 39), equals_operator, quoted(andy, 52), comma, identifier(accountno, 60), equals_operator, quoted(10020431, 74), keyword(where, 85), identifier(id, 91), equals_operator, quoted(1999, 98), semicolon(104), endoftext(104)] |
| 1153724471 | SELECT [id], [cc_type], [cc_num], [approver] FROM creditcard WHERE ([approved] = 1 AND CHARINDEX('A', [approver]) <> 1) AND ([cc_type] = 'VISA' OR [cc_type] = 'AMEX'); | [keyword(select, 1), identifier(id, 8), comma, identifier(cc_type, 14), comma, identifier(cc_num, 25), comma, identifier(approver, 35), keyword(from, 46), identifier(creditcard, 51), keyword(where, 62), left_paren(68), identifier(approved, 69), equals_operator, decimal([49]), keyword(and, 84), identifier(charindex, 88), left_paren(97), quoted(A, 98), comma, identifier(approver, 103), right_paren, not_equals_operator, decimal([49]), right_paren, keyword(and, 121), left_paren(125), identifier(cc_type, 126), equals_operator, quoted(VISA, 138), keyword(or, 145), identifier(cc_type, 148), equals_operator, quoted(AMEX, 160), right_paren, semicolon(167), endoftext(167)] |
| 69606455 | SELECT name FROM master..sysdatabases ORDER BY name | [keyword(select, 1), identifier(name, 8), keyword(from, 13), identifier(master, 18), double_period(24), identifier(sysdatabases, 26), keyword(order, 39), keyword(by, 45), identifier(name, 48), endoftext(51)] |
| 1525243926 | USE [db_piggybank] | [keyword(use, 1), identifier(db_piggybank, 5), endoftext(18)] |
| 1554743318 | SELECT * FROM directs WHERE [direct_bydate] BETWEEN '2008-01-01 00:00:00' AND '2008-05-01 23:59:59' AND [direct_timeout] > 29; | [keyword(select, 1), asterisk, keyword(from, 10), identifier(directs, 15), keyword(where, 23), identifier(direct_bydate, 29), keyword(between, 45), quoted(2008-01-01 00:00:00, 53), keyword(and, 75), quoted(2008-05-01 23:59:59, 79), keyword(and, 101), identifier(direct_timeout, 105), greater_than_operator, decimal([50, 57]), semicolon(126), endoftext(126)] |

TABLE 5-continued

| Message Classification | Message | Message Tokens |
|---|---|---|
| 1084087319 | SELECT * FROM cc_card | [keyword(select, 1), asterisk, keyword(from, 10), identifier(cc_card, 15), endoftext(21)] |
| 1116886070 | SELECT TOP 20 [id], [direct_to], [direct_timeout] FROM directs WHERE [direct_timeout] <> 27; | [keyword(select, 1), keyword(top, 8), decimal([50, 48]), identifier(id, 15), comma, identifier(direct_to, 21), comma, identifier(direct_timeout, 34), keyword(from, 51), identifier(directs, 56), keyword(where, 64), identifier(direct_timeout, 70), not_equals_operator, decimal([50, 55]), semicolon(92), endoftext(92)] |
| 853511190 | SELECT /*+ INDEX(employees emp_name_ix) */ employee_id FROM employees WHERE last_name = 'King'; | [keyword(select, 1), comment(8), identifier(employee id, 44), keyword(from, 56), identifier(employees, 61), keyword(where, 71), identifier(last_name, 77), equals_operator, quoted(King, 89), semicolon(95), endoftext(95)] |

The trans-denotation of the examples immediately above with respect to templates 510 from input message MSG-I 104 to output message MSG-O 502 showing the resulting parameterisation are shown below in Tables 6 to 19. The templates for use in each case can be determined in dependence on the message classification or cluster ID.

TABLE 6

| Template 3: | SELECT * FROM users where username = ?1; <=> SELECT * FROM users where username = 'dashgkfjhg'; |
|---|---|
| Input Message: | SELECT * FROM users where username = 'fred'; |
| Parameterisation: | ?1 = 'fred' |
| Output Message: | SELECT * from users where username = 'dashgkfjhg'; |

In this case, there is a single parameter represented as "?1" in the template head. The template body, which represents the format for the output message has the parameter "fred" replaced with the text string 'dashgkfjhg'. Thus, in the output message the name "fred" has been removed and replaced with the text string 'dashgkfjhg'. In this example one might expect that during the configuration of the template it is known that the "users" table does not contain a "username" value of 'dashgkfihg' so when it is presented with the output message the database will reply with "no results found". This may prove sufficient to prevent "fred" from gaining authorization and thus control the inappropriate access.

TABLE 7

| Template 4: | SELECT * FROM users WHERE username = ?1; <=> SELECT id, name, location FROM users WHERE username = ?1; |
|---|---|
| Input Message: | SELECT * FROM users WHERE username = 'fred'; |
| Parameterisation: | ?1 = 'fred' |
| Output Message: | SELECT id, name, location FROM users WHERE username = 'fred'; |

In the example above in Table 7, the parameterisation, appears both in the template head and the template body. Thus, in the output message the parameter itself appears as 'fred', as it did in the input message.

TABLE 8

| Template 5: | SELECT * FROM users WHERE username = ?1 AND password = ?2; <=> SELECT id, name, location FROM users WHERE username = ?1 AND password = ?2; |
|---|---|
| Input Message: | SELECT * FROM users WHERE username = 'fred' AND password = 12324; |
| Parameterisation: | ?1= 'fred', ?2 = 12324 |
| Output Message: | SELECT id, name, location FROM users WHERE username = 'fred' AND password = 12324; |

The parameterization is substantially the same as in Table 7, except in this case there are 2 parameters, both of which therefore appear in the output message.

TABLE 9

| Template 6: | SELECT * FROM users WHERE username = ?1 and password = ?2; <=> SELECT id, name, location FROM users WHERE username = ?1 and password = ?single_quote(?2); |
|---|---|
| Input Message: | SELECT * FROM users WHERE username = 'fred' and password = 12324; |
| Parameterisation: | ?1 = 'fred', ?2 = 12324 |
| Output Message: | SELECT id, name, location FROM users WHERE username = 'fred' AND password = '12324'; |

In this example, the output message contains the two parameters identified in the template head, but the second of the parameters has been converted from the number to the text string as it now has single quotes around it.

TABLE 10

| Template 7: | UPDATE users SET [username] = ?1, [password] = ?2, [accountNo] = ?3 WHERE [id] = ?4; <=> DELETE users WHERE [id] = ?4; |
|---|---|
| Input Message: | UPDATE users SET [username] = 'andy', [password] = 'andy', [accountNo] = '10020431' WHERE [id] = '1999'; |
| Parameterisation: | ?1 = 'andy', ?2 = 'andy', ?3 = '10020431', ?4 = '1999' |
| Output Message: | DELETE users WHERE [id] = '1999'; |

In the example of Table 10, 4 parameters are identified in the template head (?1 to ?4) and all but one, parameter '?4', is discarded in the output message.

TABLE 11

| Template 8: | UPDATE users SET [username] = ?1, [password] = ?2, [accountNo] = ?3 WHERE [id] = ?4; <=> UPDATE users SET [username] = NULL, [password] = 'A8FFF310AAD5', [accountNo] = ?3 WHERE [id] = ?4; |
|---|---|
| Input Message: | UPDATE users SET [username] = 'andy', [password] = 'andy', [accountNo] = '10020431' WHERE [id] = '1999'; |
| Parameterisation: | ?1 = 'andy', ?2 = 'andy', ?3 = '10020431', ?4 = '1999' |
| Output Message: | UPDATE users SET [username] = NULL, [password] = 'A8FFF310AAD5', [accountNo] = '10020431' WHERE [id] = '1999'; |

The template used in this example serves to re-set Andy's password to A8FFF310AAD5. This might be used where for example a database has a policy of not allowing a password to be the same as a username.

TABLE 12

| Template 9: | SELECT [id], [cc_type], [cc_num], [approver] FROM creditcard WHERE ([approved] = 1 AND CHARINDEX('A', [approver]) <> 1) AND ([cc_type] = 'VISA OR [cc_type] = AMEX'); <=> SELECT [id], [cc_type], [cc_num], [approver] FROM creditcard WHERE ([approved] = 0 AND CHARINDEX('A', [approver]) <> 0) AND ([cc_type] = 'VISA' OR [cc_type] = 'makeoff'); |
|---|---|
| Input Message: | SELECT [id], [cc_type], [cc_num], [approver] FROM creditcard WHERE ([approved] = 1 AND CHARINDEX('A', [approver]) <> 1) AND ([cc_type] = 'VISA' OR [cc_type] = AMEX'); |
| Parameterisation: | <none> |
| Output Message: | SELECT [id], [cc_type], [cc_num], [approver] FROM creditcard WHERE ([approved] = 0 AND CHARINDEX('A', [approver]) <> 0) AND ([cc_type] = 'VISA' OR [cc_type] = 'makeoff'); |

In the example of Table 12, the input message has a request for "id, cctype, ccnum, approver" from the table "creditcard" where the credit card type is Visa or Amex. This is changed in the output message so that the Amex is replaced with a credit card type of 'makeoff'.

TABLE 13

| Template 10: | ?1 sysdatabases ?2 <=> ?1 mytable ?2 |
|---|---|
| Input Message: | SELECT name FROM master..sysdatabases ORDER BY name |
| Parameterisation: | ?1 = SELECT name FROM master.. , ?2 = ORDER BY name |
| Output Message: | SELECT name FROM master., mytable ORDER BY name |

As can be seen in Table 13, the parameters include anything that fills the corresponding positions, as defined in the template head, within the input message. In this case then, the input message is "SELECT name FROM master.sysdatabases ORDER BY name". The template defines anything appearing before the word "sysdatabases" as being the first parameter and anything after as being the second parameter. Thus, the template has the effect of receiving any message with the word sysdatabases and generating an output message in which this is changed to "mytable". Such a template is useful when denoting a message that is attempting to find out information about what databases are held within a system and what they are called.

TABLE 14

| Template 11: | ?1 [db_piggybank] ?2 <=> ?1 [db_dummy] ?2 |
|---|---|
| Input Message: | USE [db_piggybank] |
| Parameterisation: | ?1 = USE, ?2 = <none> |
| Output Message: | USE [db_dummy] |

In this case, as shown in Table 14, the template is used to redirect enquires away from a database called "piggybank" and instead direct to a dummy database called "dummy". The input message is a request to use the piggybank database. This is trans-denotated instead to a harmless message which is a request to use the dummy database named "dummy". The template includes 2 parameters on each side but in the input message there is no content after the database name indicator so as shown, the second parameter ?2 is blank.

TABLE 15

| Template 12: | SELECT * FROM directs WHERE [direct_bydate] BETWEEN ?1 AND ?2 AND [direct_timeout] > ?3; <=> SELECT * FROM directs WHERE [direct_bydate] > '1900-01-01 00:00:01' AND [direct_timeout] > ?3; |
|---|---|
| Input Message: | SELECT * FROM directs WHERE [direct_bydate] BETWEEN '2008-01-01 00:00:00' AND '2008-05-01 23:59:59' AND [direct_timeout] > 29; |
| Parameterisation: | ?1 = '2008-01-01 00:00:00', ?2 = '2008-05-01 23:59:59', ?3 = 29 |
| Output Message: | SELECT * FROM directs WHERE [direct_bydate] > '1900-01-01 00:00:01' AND [direct_timeout] > 29; |

In this case, as shown in Table 15, the template is used to remove a search condition on the attribute '[direct_bydate]' (provided by the BETWEEN keyword) from the input message and replace it with a greater-than comparison (>) whilst maintaining the information in the parameter relating to the '[direct_timeout]' attribute.

TABLE 16

| Template 13: | SELECT * FROM users where username = ?1 <=> SELECT * FROM users |
|---|---|
| Input Message: | SELECT * FROM users where username = 'fred' |
| Parameterisation: | ?1 = 'fred' |
| Output Message: | SELECT * FROM users |

In the example shown above in Table 16, a more constrained message is trans-denotated to a less constrained message. The template head includes the limitation "where username=?1". In the template body this is not present. Thus the parameterization is used to identify the parameter (the username in this case) from the input message and discard it to generate the output message.

TABLE 17

| Template 14: | SELECT * FROM cc_card <=> SELECT * FROM cc_card; |
|---|---|
| Input Message: | SELECT * FROM cc_card |
| Parameterisation: | <none> |
| Output Message: | SELECT * FROM cc_card; |

The example shown above in Table 17 simply serves to add a semicolon ';' on the end of the input message. This can be significant in some database applications as there are databases that allow more than one query at once in which case the queries would need to be separated by a semicolon. Thus the denotation enables the received input message to be presented as part of a multiple query to a database.

TABLE 18

| | |
|---|---|
| Template 15: | SELECT TOP ?1 [id], [direct_to], [direct_timeout] FROM directs WHERE [direct_timeout] <> ?2; <=> SELECT [id], [direct_to], [direct_timeout] FROM directs WHERE [direct_timeout] <> ?2; |
| Input Message: | SELECT TOP 20 [id], [direct_to], [direct_timeout] FROM directs WHERE [direct_timeout] <> 27; |
| Parameterisation: | ?1 =20, ?2 = 27 |
| Output Message: | SELECT [id], [direct_to], [direct_timeout] FROM directs WHERE [direct_timeout] <> 27; |

The example shown above in Table 18 simply serves to remove the first parameter from the input message. In this message the effect is to extend the breadth of the request. The original request (input message) was for the first 20 (expressed with "TOP 20") examples of the values for attributes [id], [direct_to], [direct_timeout], from the 'directs' table, whereas in the output message, the request is not so limited. All values for [id], [direct_to], [direct_timeout], will be returned. Often the trans-denotation might work the other way, i.e. the extent of a request is limited or narrowed.

TABLE 19

| | |
|---|---|
| Template 16: | SELECT ?1 employee_id FROM employees WHERE last_name = ?2; <\|> ?hint(?1) <=> SELECT /* Hint removed by DataWall */ employee_id FROM employees WHERE last_name = ?2; |
| Input Message: | SELECT /*+ INDEX(employees emp_name_ix) */ employee_id FROM employees WHERE last_name = 'King'; |
| Parameterisation: | ?1 = /*+ INDEX(employees emp_name_ix) */, ?2 = 'King' |
| Output Message: | SELECT /* Hint removed by DataWall */ employee_id FROM employees WHERE last_name = 'King'; |

In the example shown in Table 19, a hint is provided in the template. The hint is merely a way of communicating something to a database without it being a part of the substantive actionable message (i.e. the hint does not alter the result, merely gives the database guidance on the methods it should use to generate the result). The parameterisation serves to find the hint in the message and leave a comment in the out put message to mark that it has been done.

Template Specifications with Guards

Guard conditions are indicated in Template Specifications by the symbol "<|>" (as specified by the Trans-Denotation Grammar in Table 2 above). As with the Template Head and body separator symbol "<=>", it is not part of the language of SQL.

To illustrate template specifications with guards, some examples of input messages in SQL for interacting with relational databases are shown below in Table 20. As above, each of the messages MSG 104 (typically input messages) is shown with its message classification 402 as determined by Efficient Grammatical Clustering, and the Message Tokens TOKENS-I 502 generated by the SQL language aware tokenizer 501. The templates that will be used to perform the trans-denotation include guard functions.

TABLE 20

| Message Classification | Message | Message Tokens |
|---|---|---|
| 654555190 | SELECT * FROM users WHERE accountNo = 30020400; | [keyword(select, 1), asterisk, keyword(from, 10), identifier(users, 15), keyword(where, 21), identifier(accountno, 27), equals_operator, decimal([51, 48, 48, 50, 48, 52, 48, 48]), semicolon(47), endoftext(47)] |
| 654555190 | SELECT * FROM users WHERE accountNo = –100 | [keyword(select, 1), asterisk, keyword(from, 10), identifier(users, 15), keyword(where, 21), identifier(accountno, 27), equals_operator, minus sign, decimal([49, 48, 48]), endoftext(42)] |
| 654555190 | SELECT * FROM users WHERE accountNo = 'abcdefghij'; | [keyword(select, 1), asterisk, keyword(from, 10), identifier(users, 15), keyword(where, 21), identifier(accountno, 27), equals_operator, quoted(abcdefghij, 39), semicolon(51), endoftext(51)] |
| 426052631 | SELECT * FROM users WHERE checked = 'YES' | [keyword(select, 1), asterisk, keyword(from, 10), identifier(users, 15),keyword(where, 21), identifier(checked, 27), equals_operator, quoted(YES, 37), endoftext(41)] |

The trans-denotation of the examples immediately above with respect to templates 510 from input message MSG-I 104 to output message (MSG-O 502) showing the resulting parameterisation are shown below in Tables 21 to 23.

TABLE 22

| | |
|---|---|
| Template 17: | SELECT * FROM users WHERE accountNo = ?1; <\|> ?not_numeric_range(?1, 10000000, 19999999, 0, ?2 ) <=> SELECT * FROM users WHERE accountNo = ?2; |
| Input Message: | SELECT * FROM users WHERE accountNo = 30020400; |
| Parameterisation: | ?1 = 30020400 |
| Guard Replacement: | ?2 = ?1 if ?1 is in range, otherwise ?2 = 0 |
| Output Message: | SELECT * FROM users WHERE accountNo = 0; |

In the example shown in Table 22, the template head includes the guard function "?not_numeric_range(?1, 10000000, 1999999, 0, ?2)" (which follows the Guard separator symbol "<=>"). The guard function "not_numeric_range" takes the value of the parameter denoted by ?1 and tests whether the value falls within the range of integers 10000000 to 1999999. If the value of the parameter denoted by ?1 falls within the specified range then the result of the guard function is the value of the parameter denoted by ?2, i.e. 30020400. Otherwise, if the value of the parameter denoted by ?1 falls outside the range then the result of the guard function is 0. In this particular example, the account number 30020400 present in the input message is not within the range specified by the guard function and so the value of parameter ?2 in the output message is 0. Thus the use of guard functions within the templates provides a means by which tests can be performed on input messages for various reasons, e.g. security. In this example the database is protected from returning information about accounts whose account numbers are not within the appropriate range. The reply from the database will now be with respect to accountNo '0'. This may hold information that is benign and safe to return, even though the original request was unsafe and inappropriate.

TABLE 23

| Template 18: | SELECT * FROM users WHERE accountNo = ?1 <\|> ?not_numeric_range(?1, 10000000, 1999999, 0, ?2 ) <=> SELECT * FROM users WHERE accountNo = ?2; |
|---|---|
| Input Message: | SELECT * FROM users WHERE accountNo = −100 |
| Parameterisation: | ?1 = −100 |
| Guard Replacement: | ?2 = ?1 if ?1 is in range, otherwise ?2 = 0 |
| Output Message: | SELECT * FROM users WHERE accountNo = 0; |

The example of Table 23 is substantially the same as that of Table 22, except in this case, details have been requested in relation to account number −100. Again though, this value is outside the range specified by the guard in the template head and so a value of 0 is returned in the output message. The reply from the database will now be with respect to accountNo '0'. This may hold information that is benign and safe to return, even though the original request was unsafe and inappropriate.

TABLE 24

| Template 19: | SELECT * FROM users WHERE accountNo = ?1; <\|> ?not_numeric_range(?1, 10000000, 1999999, 0, ?2 ) <=> SELECT * FROM users WHERE accountNo = ?2; |
|---|---|
| Input Message: | SELECT * FROM users WHERE accountNo = 'abcdefghij'; |
| Parameterisation: | ?1 = 'abcdefghij' |
| Guard Replacement: | ?2 = ?1 if ?1 is in range, otherwise ?2 = 0 |
| Output Message: | SELECT * FROM users WHERE accountNo = 0; |

The example of Table 24 is substantially the same as that of Table 22, except in this case, details have been requested in relation to account number represented by the text string 'abcdefghij'. The template guard is testing for a numeric value, and in this case it has been sent a text string. The text string cannot satisfy the guard condition so a value of 0 is returned in the output message.

TABLE 25

| Template 20: | SELECT * FROM users WHERE accountNo = ?1; <\|> ?not_integer(?1, 0, ?2 ) <=> SELECT * FROM users WHERE accountNo = ?2; |
|---|---|
| Input Message: | SELECT * FROM users WHERE accountNo = 'abcdefghij'; |
| Parameterisation: | ?1 = 'abcdefghij' |
| Guard Replacement: | ?2 = ?1 if ?1 is an integer, otherwise ?2 = 0 |
| Output Message: | SELECT * FROM users WHERE accountNo = 0; |

The example of Table 25 is substantially the same as that of Table 22, except in this case, the guard function relates to whether or not the requested account number is an integer. In other words, if the requested account number is an integer then its value is returned in the output message (as parameter ?2). If it is not, then the output message includes its value as the account number 0. In this case, as the requested account number is a text string, the value for the account number returned in the output message is 0.

TABLE 26

| Template 21: | SELECT * FROM users WHERE checked = ?1 <\|> ?not_boolean(?1, FALSE, ?2) <=> SELECT * FROM users WHERE checked = ?2; |
|---|---|
| Input Message: | SELECT * FROM users WHERE checked = 'YES' |
| Parameterisation: | ?1 = 'YES' |
| Guard | ?2 = ?1 if ?1 is a boolean, otherwise |
| Replacement: | ?2 = FALSE |
| Output Message: | SELECT * FROM users WHERE checked = FALSE; |

The example of Table 26 is similar to that of Table 22, except in this case, the Guard Function relates to whether or not the value for parameter ?1 is a Boolean type ('TRUE' or 'FALSE'). If it is, then the value returned in the output message would be the value of the Boolean type. If not, then the value returned in the output message is the value FALSE. Thus it can be appreciated that the use of templates with guard functions adds a further utility to the trans-denotation method described herein.

Embodiments of the invention have been described with particular reference to the examples illustrated. However, it will be appreciated that variations and modifications may be made to the examples described within the scope of the invention. For example different languages, different instrumented computer programs, differing message formats, different input/output formats to computer programs may all be used as appropriate. It will also be appreciated that the invention may be provided as a computer program on a computer readable medium for storing and use on a computer or computer system.

The invention claimed is:

1. A method of processing a computer message, the method comprising:
    upon receipt of the computer message at a computer, classifying the computer message, wherein the classifying of the computer message includes using efficient grammatical clustering (EGC) to classify the computer message, and wherein using EGC to classify includes:
        determining a syntactic execution path of the computer message through an EGC program;
        analyzing previously determined correct structure and syntactic validity to provide a context which limits complexity of the classification;
        using pattern matching of the computer message against a template; and
        based on the syntax execution path, the determined context, and results of the pattern matching, providing a classification of the computer message;
    assigning the computer message to a message cluster identification in dependence thereon; and
    utilizing a message template to trans-denotate the computer message, wherein the message template is selected in dependence on the message cluster identification, and wherein trans-denoting of the computer message comprises:
        receiving the message template and the computer message;
        sending the message template and the computer message to a language aware tokenizer;
        producing, by the language aware tokenizer, input tokens from the computer message;

producing, by the language aware tokenizer, template tokens from the message template; and sending the input tokens and the template tokens to a template matching process, wherein the template matching process generates a sequence of output tokens that are used to generate a corresponding output message by analyzing the sequence of output tokens with computer-readable rules to obtain patterns of the sequence of tokens by:

determining a path that is taken by each of the tokens through the computer-readable rules which successfully terminates; and grouping the tokens according to the path.

2. The method according to claim 1, comprising, upon receipt of the computer message, tokenizing the computer message to produce a sequence of message tokens corresponding to the computer message.

3. The method according to claim 1, in which the message template includes a template head which corresponds to the format of the received computer message and a template body which corresponds to the format of the output message.

4. The method according to claim 3, comprising tokenizing the template to produce a sequence of head message tokens and a sequence of body template tokens.

5. The method according to claim 4, in which a series of output tokens are used to generate the output message.

6. The method according to claim 1, in which the message template includes parameterization to enable operations to be performed on parameters within a received message.

7. The method according to claim 1, in which the message template includes one or more guard functions to perform a test on an input message parameter.

8. The method according to claim 1, wherein the computer message is a query to a relational database.

9. The method according to claim 1, comprising generating at least one alternative message based on the computer message.

10. The method according to claim 1, wherein the template is arranged such that the computer message is translated from one language to another.

11. The method according to claim 1, wherein the trans-denotation serves to change the computer message to one that has improved properties and/or to change the computer message so that elements of the computer message are no longer publicly readable.

12. The method according to claim 1, in which the computer message is changed prior to forwarding to a resource such that the resource is prevented from answering the computer message in a defined manner.

13. The method according to claim 12, in which the computer message is changed prior to forwarding to a resource such that the resource responds with a reply that no longer contains sensitive information.

14. A non-transitory computer readable medium having sets of instructions stored thereon, which when executed by a computer causes the computer to:

upon receipt of a computer message, classify the computer message, wherein the classifying of the computer message includes using efficient grammatical clustering (EGC) to classify the computer message, and wherein using EGC to classify includes:

determining a syntactic execution path of the computer message through an EGC program;

analyzing previously determined correct structure and syntactic validity to provide a context which limits complexity of the classification;

using pattern matching of the computer message against a template; and based on the syntax execution path, the determined context, and results of the pattern matching, providing a classification of the computer message;

assign the computer message to a message cluster identification in dependence thereon; and utilize a message template to trans-denotate the computer message, wherein the message template is selected in dependence on the message cluster identification, and wherein trans-denotating of the computer message comprises:

receiving the message template and the computer message;

sending the message template and the computer message to a language aware tokenizer;

producing, by the language aware tokenizer, input tokens from the computer message;

producing, by the language aware tokenizer, template tokens from the message template; and sending the input tokens and the template tokens to a template matching process, wherein the template matching process generates a sequence of output tokens that are used to generate a corresponding output message by analyzing the sequence of output tokens with computer-readable rules to obtain patterns of the sequence of tokens by:

determining a path that is taken by each of the tokens through the computer-readable rules which successfully terminates; and grouping the tokens according to the path.

15. A computer system for processing a computer message, the system comprising:

a memory device; and a computer processor in communication with the memory device, wherein the memory device includes sets of instruction which, when executed by the computer processor, cause the computer processor to:

upon receipt of the computer message, classify the computer message, wherein the classifying of the computer message includes using efficient grammatical clustering (EGC) to classify the computer message, and wherein using EGC to classify includes:

determining a syntactic execution path of the computer message through an EGC program;

analyzing previously determined correct structure and syntactic validity to provide a context which limits complexity of the classification;

using pattern matching of the computer message against a template; and based on the syntax execution path, the determined context, and results of the pattern matching, providing a classification of the computer message;

assign the computer message to a message cluster identification in dependence thereon; and utilize a message template to trans-denotate the computer message, wherein the message template is selected in dependence on the message cluster identification, and wherein trans-denotating of the computer message comprises:

receiving the message template and the computer message;

sending the message template and the computer message to a language aware tokenizer;

producing, by the language aware tokenizer, input tokens from the computer message;

producing, by the language aware tokenizer, template tokens from the message template; and sending the input tokens and the template tokens to a template matching process, wherein the template matching process generates a sequence of output tokens that are used to generate a corresponding output message by analyzing the sequence of output tokens with computer-readable rules to obtain patterns of the sequence of tokens by:

determining a path that is taken by each of the tokens through the computer-readable rules which successfully terminates; and grouping the tokens according to the path.

* * * * *

UNITED STATES PATENT AND TRADEMARK OFFICE
CERTIFICATE OF CORRECTION

| | | |
|---|---|---|
| PATENT NO. | : 8,666,731 B2 | Page 1 of 1 |
| APPLICATION NO. | : 12/887725 | |
| DATED | : March 4, 2014 | |
| INVENTOR(S) | : Moyle et al. | |

It is certified that error appears in the above-identified patent and that said Letters Patent is hereby corrected as shown below:

On the Title Page

On page 2, column 2, under (56) Other Publications, line 26, delete "Intelliegence" and insert -- Intelligence --, therefor.

In the Specification

In column 1, line 18, delete "computer" and insert -- computer. --, therefor.

In column 15, line 50, delete "'dashgkfihg'" and insert -- 'dashgkfjhg' --, therefor.

Signed and Sealed this
Eighth Day of July, 2014

Michelle K. Lee
*Deputy Director of the United States Patent and Trademark Office*